Figure 1:
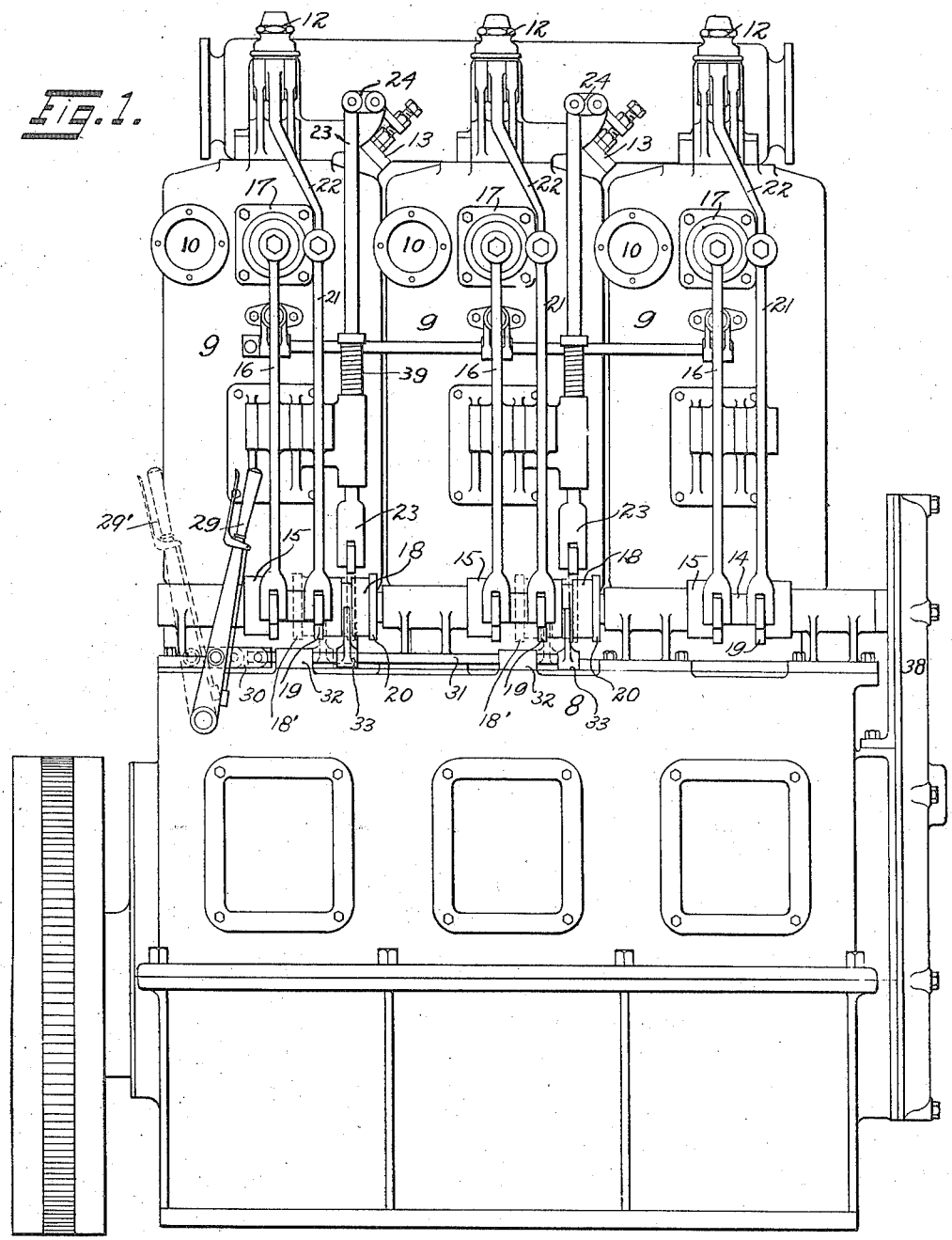

J. W. ANDERSON.
VALVE SETTING GEAR FOR DIESEL ENGINES.
APPLICATION FILED MAR. 2, 1916.

1,265,029.

Patented May 7, 1918.
3 SHEETS—SHEET 1.

INVENTOR
John W. Anderson,
BY
Attorneys.

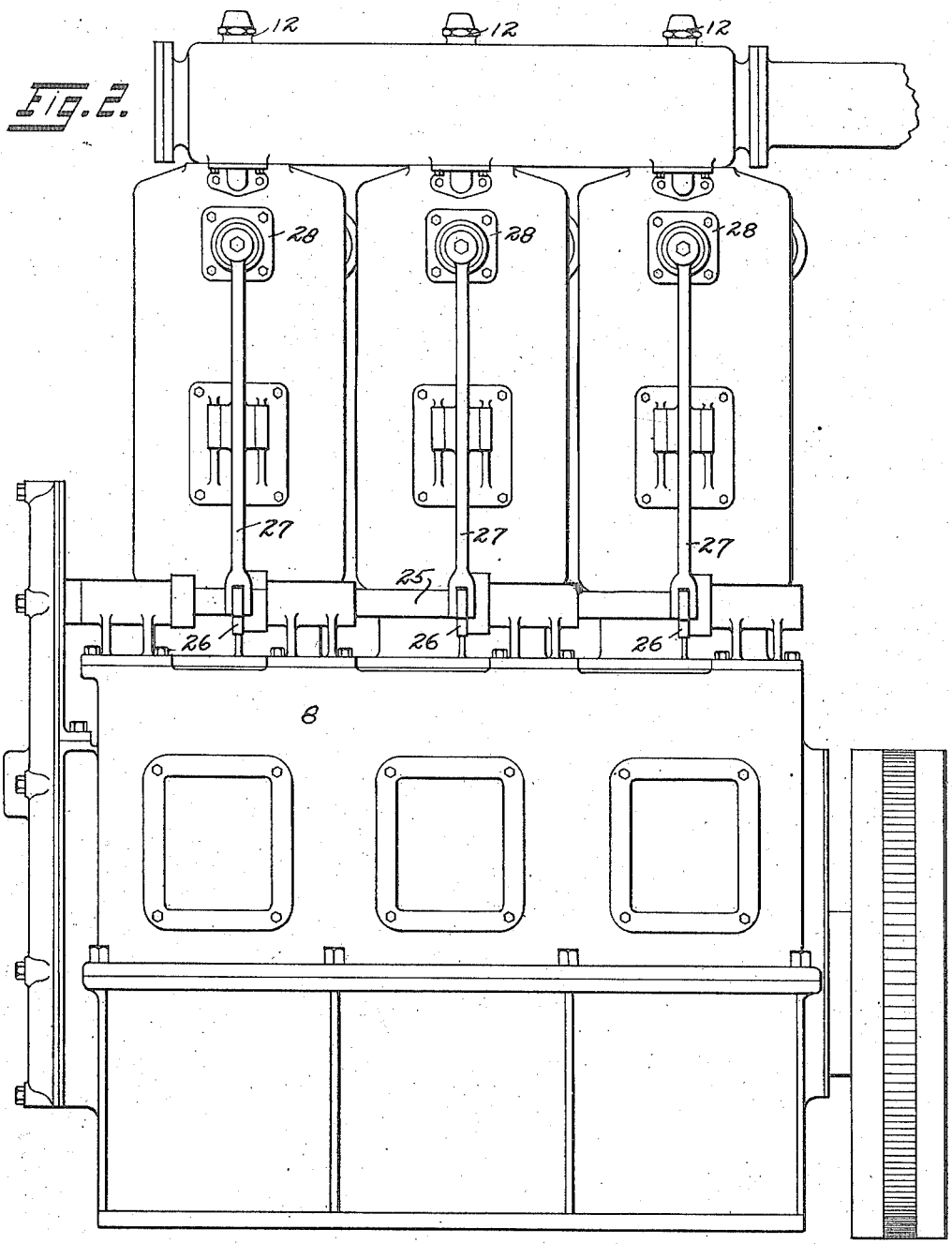

J. W. ANDERSON.
VALVE SETTING GEAR FOR DIESEL ENGINES.
APPLICATION FILED MAR. 2, 1916.
1,265,029.
Patented May 7, 1918.
3 SHEETS—SHEET 3.
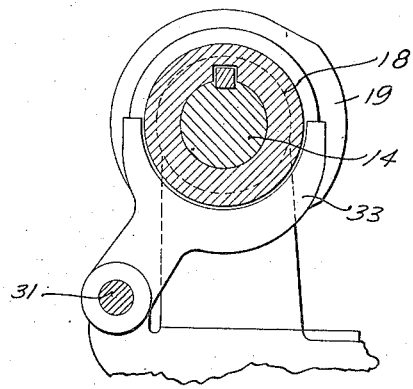
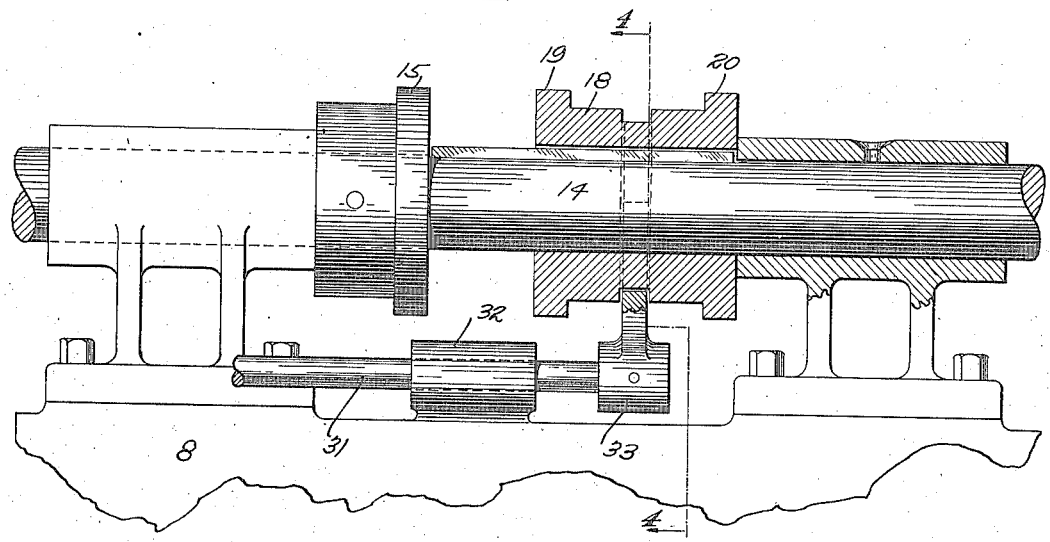
INVENTOR
John W. Anderson,
BY
ATTORNEYS.

UNITED STATES PATENT OFFICE.

JOHN W. ANDERSON, OF NEW LONDON, CONNECTICUT, ASSIGNOR TO ELECTRIC BOAT COMPANY, OF NEW YORK, N. Y., A CORPORATION OF NEW JERSEY.

VALVE-SETTING GEAR FOR DIESEL ENGINES.

1,265,029.   Specification of Letters Patent.   Patented May 7, 1918.

Application filed March 2, 1916. Serial No. 81,599.

*To all whom it may concern:*

Be it known that I, JOHN W. ANDERSON, a citizen of the United States, and a resident of New London, in the county of New London and State of Connecticut, have invented certain new and useful Improvements in Valve-Setting Gear for Diesel Engines; and I do hereby declare the following to be a full, clear, and exact description of the invention, such as will enable others skilled in the art to which it appertains to make and use the same.

This invention relates to internal combustion engines of the Diesel type and is directed to the provision of an improved form of starting mechanism for such an engine, which mechanism is simple in construction, convenient to actuate, and reliable and efficient in its operation.

In internal combustion engines of the Diesel type as now commonly constructed, each cylinder is provided with an inlet valve for admitting air to the cylinder, which air is compressed during the compression stroke of the piston, a fuel-spray valve through which fuel in liquid form is sprayed into the cylinder near the end of the compression stroke, and an exhaust valve through which the products of combustion pass from the cylinder at the end of the power stroke. In addition to these valves which are actuated periodically throughout the operation of the engine, it is usual to provide some or all of the cylinders of a multi-cylinder engine with starting valves through which compressed air may be admitted to the cylinders to start the engine in operation and as soon as the engine is running, these starting valves are rendered inoperative. The present invention relates to a Diesel engine of this type, and in accordance with the invention a simple and readily operated controlling mechanism is provided whereby compressed air may be admitted to the cylinders through the starting valves to start the operation and thereafter a suitable change made so as to discontinue the operation of the starting valves and cause operation of the engine in the usual manner.

When an internal combustion engine of the Diesel type is being started by the admission of compressed air to the cylinders through suitable starting valves, it is unnecessary to discontinue the operation of the inlet valves through which compressed air is admitted to the cylinders for compression during the compression strokes of the pistons. The spray valves, however, must be rendered inoperative during the starting operation since the admission of liquid fuel at that time would involve a danger of injury to the engine. The invention therefore contemplates the provision of means whereby the air-starting valves of a Diesel engine may be rendered operative and the spray valves rendered inoperative simultaneously and vice versa and by a single operating mechanism.

In the preferred embodiment of the invention, the valves of the several cylinders are operated by means of cams on suitable cam shafts. Certain of these cams may be fixedly mounted upon the cam shafts, as, for instance, the cams for operating the inlet valves and the cams for operating the exhaust valves. The cams for operating the spray valves and compressed air-starting valves, however, are mounted for movement upon the cam shafts so that either one may be rendered operated and the other inoperative as desired. Preferably the spray valve and the starting valve of each cylinder are formed upon a sleeve which is movable upon the cam shaft and the two cams are spaced apart by such a distance that when one is in operative position the other is in inoperative position. A single operating mechanism such as a handle is connected to the several movable sleeves so that all of them may be moved from one of their two positions to the other simultaneously. In this way, the cams for the starting valves may be rendered operative so as to admit compressed air to some or all of the cylinders for starting the engine, and thereafter, by a single movement of the operative handle, the movable cams may be shifted simultaneously so as to discontinue the operation of the starting valves and cause operation of the spray valves.

The preferred embodiment of the invention is illustrated in the accompanying drawings, in which Figure 1 is a side elevation of the engine; Fig. 2 is a similar view showing the opposite side of the engine; Fig. 3 is an enlarged detail view partly in section and partly in elevation showing one of the movable cams and the means for effecting movement thereof; and Fig. 4 is a transverse section on line 4—4 of Fig. 3.

Referring to these drawings, the reference 8 indicates the usual engine-bed and crankcase having mounted thereon a plurality of cylinders 9, the number of which may be varied as desired. Each of these cylinders is provided with an inlet valve 17 controlling the admission of compressed air to the cylinder through a suitable passage 10. Each inlet valve 17 is adapted to be operated by a lever 16 disposed parallel to the cylinder and pivotally mounted intermediate its ends thereon. The lower end of the lever 16 carries a roller adapted to coact with a cam 15 mounted upon the cam shaft 14 which is driven from the engine shaft in any usual manner, as by means of gears inclosed in a gear-case 38. The exhaust valve 28 of each cylinder is similarly operated by a lever 27 (Fig. 2) pivotally mounted upon the cylinder and rocked by a cam 26 mounted upon a cam shaft 25 similar to the cam shaft 14 but located upon the opposite side of the line of cylinders. Each spray valve 12 is operated by a bell-crank lever 22 pivotally mounted upon the corresponding cylinder and actuated by a pivoted lever 21 which is a duplicate of the lever 16.

Certain of the cylinders are provided with starting valves 13 for the admission of compressed air to the cylinders to start the engine in operation. Each of these starting valves 13 is operated by a lever 24 and a push-rod 23, the latter being normally compressed downwardly by a spring 39. The push-rod 23 of the starting valve 13 and the adjacent lever 21 of the spray valve 12 are operated by cams 20 and 19 respectively formed upon a sleeve 18 which is movable axially upon the cam shaft 14 but splined to the shaft so as to rotate therewith, as is shown in Fig. 3. The cams 20 and 19 are spaced apart by such a distance that when one of them is in position to coact with the lever or rod operated thereby, the other is in an inoperative position. A hand-lever 29 is pivotally mounted upon the crank-case 8 and connected by means of a link 30 with a sliding rod 31 supported in bearings 32 on the crank-case. Rod 31 has fixedly mounted thereon two yokes 33, each of which engages one of the sleeves 18. Upon shifting the lever 29 to its broken line position 29', the two sleeves 18 will be shifted to their broken line positions 18'. As shown in full lines, the cams 19 are in position for rocking the rods 21 to actuate the spray valves and when the sleeves 18 are moved to the dotted line positions, the cams 20 are carried into position for operating the push-rods 23 of the starting valves.

In order to start the engine in operation, the handle 29 is moved to the dotted line position and this movement makes the cams 20 of the starting valves operative and renders the cams 19 of the spray valves inoperative. Compressed air is thus admitted to certain of the cylinders of the engine to start the engine in operation and during this operation the inlet valves 17 may be operated in the usual manner, as the admission of air to the cylinders through the inlet valves will have no effect upon the starting of the engine in operation. The movement of the sleeves 18 to the positions for actuating the starting valves 13, however, carries the cams 19 of the spray valves 12 to inoperative position, so that during the starting operation, liquid fuel will not be admitted to the cylinders through the spray valves 12. After the engine has been started in operation by compressed air, the handle 29 is moved to the position shown in full lines, thereby carrying the sleeves 18 to the positions in which the starting valves 13 are rendered inoperative and the cams 19 carried to positions for actuating the spray valves 12 so as to operate the engine in the usual manner.

What I claim is:

1. An internal combustion engine of the Diesel type comprising the combination of a plurality of cylinders arranged in line, inlet and exhaust valves for each cylinder, a spray valve for each cylinder, an air-starting valve for each cylinder, a shaft extending along the line of cylinders, a cam for each cylinder stationarily mounted upon the cam shaft in position for operating one of the said inlet and exhaust valves of the cylinder, a sleeve for each cylinder splined upon the cam shaft, two cams on each sleeve, one for operating the spray valve and one for operating the air-starting valve of the corresponding cylinder, and means for moving all of the sleeves axially upon the cam shaft to carry the cams on the sleeves into position for operating the air-starting valves and out of position for operating the spray valves or vice versa as desired; substantially as described.

2. In an internal combustion engine, a plurality of cylinders each having an air inlet valve, a fuel-spray valve, an exhaust valve, and a compressed air starting valve; operating devices for the valves; a cam shaft driven by the engine; a plurality of spaced sleeves splined on the cam shaft; a plurality of cams on each sleeve, each cam actuating one of the operating devices; a slide rod alongside the cam shaft; and a plurality of shippers secured to the slide rod, one for engaging each of the sleeves, whereby the slide rod may be positioned either to set a cam on each sleeve to operate the air starting valve of a cylinder or to set a cam on each sleeve to operate the fuel-spray valve of a cylinder.

3. In an internal combustion engine, in combination, a plurality of cylinders arranged in line and each having an air-starting valve, a fuel-spray valve and another valve (as an inlet valve), a cam shaft, a plurality of valve actuators each interposed between one of said valves and said cam shaft, a plurality of cams for controlling the valve actuators for said inlet valves and fixedly mounted on said shaft, a plurality of cams for controlling said valve actuators for said air-starting and fuel-spray valves and keyed on but slidable axially of the cam shaft and a single means for sliding as aforesaid all said slidable cams whereby in one adjustment of said cams the latter merely operate the valve actuators for the air-starting valves and in another adjustment of said cams the latter merely operate the valve actuators for the fuel-spray valves, the fixed cams being arranged on the cam shaft in alternation with the slidable cams; substantially as described.

4. In an internal combustion engine, in combination, a plurality of cylinders arranged in line, an inlet valve for each cylinder, an exhaust valve for each cylinder, a cam-shaft carrying fixedly thereon a cam for one of said valves of each cylinder, an air-starting valve on one of the cylinders, a fuel-spray valve on each of said cylinders, a cam sleeve rotatable with said cam shaft but axially adjustable thereon, said sleeve carrying a cam for said air-starting valve and a cam for the fuel-spray valve of the cylinder with which said air-starting valve is associated, means adapted to shift said sleeve axially of said cam shaft whereby in one adjustment of said sleeve but one of the sleeve-carried cams becomes effective, and in another adjustment the other of said sleeve-carried cams becomes effective, means actuated by one of said sleeve-carried cams, when effective as aforesaid, to operate predeterminedly said air-starting valve and means actuated by the other of said sleeve-carried cams, when effective as aforesaid, to operate predeterminedly the fuel-spray valve of the cylinder with which said air-starting valve is associated; substantially as described.

5. In an internal combustion engine, in combination, a plurality of cylinders arranged in line, an inlet valve for each cylinder, an exhaust valve for each cylinder, a cam shaft carrying fixedly thereon a cam for one of said valves of each cylinder, an air-starting valve on one of the cylinders, a fuel-spray valve on each of said cylinders, and a cam sleeve rotatable with said cam shaft but axially adjustable thereon, said sleeve carrying a cam for said air-starting valve and a cam for the fuel-spray valve of the cylinder with which said air-starting valve is associated, means adapted to shift said sleeve axially of said cam shaft whereby in one adjustment of said sleeve but one of the sleeve-carried cams becomes effective, and in another adjustment the other of said sleeve-carried cams becomes effective, means actuated by one of said sleeve-carried cams, when effective as aforesaid, to operate predeterminedly said air-starting valve, means actuated by the other of said sleeve-carried cams, when effective as aforesaid, to operate predeterminedly the fuel-spray valve of the cylinder with which said air-starting valve is associated, and a second cam shaft carrying fixedly thereon a cam for the other of said inlet and exhaust valves on each cylinder, said two cam shafts being located on opposite sides of the line of cylinders; substantially as described.

In testimony whereof I affix my signature.

JOHN W. ANDERSON.